Feb. 18, 1941.        C. WEYGAND         2,232,354.
COOLING CHAMBER FOR MICROSCOPES
Filed Oct. 10, 1939
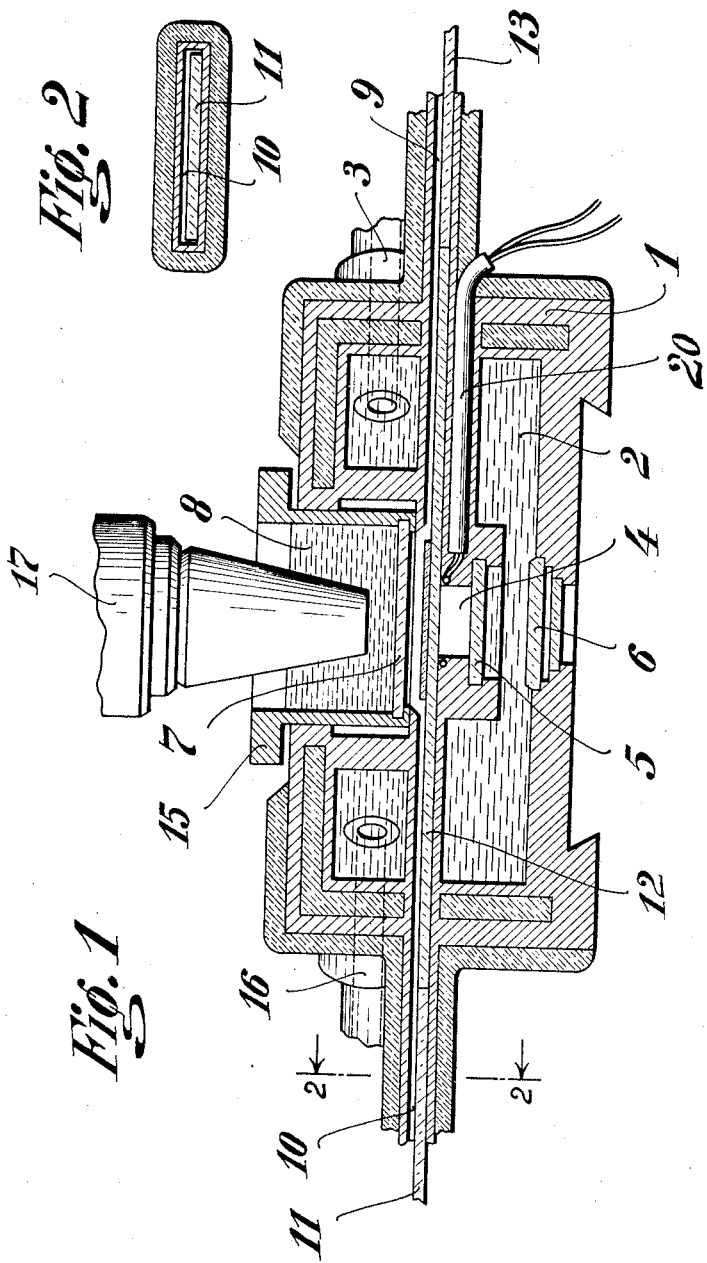
INVENTOR
*Conrad Weygand*
BY
*Ivan E. C. Konigsberg*
ATTORNEY Patented Feb. 18, 1941

2,232,354

UNITED STATES PATENT OFFICE 2,232,354

COOLING CHAMBER FOR MICROSCOPES

Conrad Weygand, Leipzig, Germany, assignor, by mesne assignments, to Frank Dumur, Lausanne, Switzerland Application October 10, 1939, Serial No. 298,740
In Germany November 21, 1938

2 Claims. (Cl. 88—40)

This invention relates to improvements in cooling chambers for microscopes and the object of the invention is to provide a generally improved cooling chamber including means for preventing the formation of a precipitate in the object space caused by moisture contained in the air which enters such space.

Specifically the object of the invention is to prevent the formation of such precipitate in the object space of a microscope by connecting the object space with the outside air by means of a relatively long communicating channel or hollow space. The length of such channel is so proportioned that there is a drop in the temperature as the air passes into the object space from the outside. The said channel also serves as a guide for object carrying slides or carriers which may conveniently be pushed from the outside so as to place the object beneath the microscope tube in proper position for observation. Still another advantage is that by moving object slides through such a channel, objects may be quickly removed, replaced and changed about.

The invention is illustrated in the accompanying drawing in which Fig. 1 is a sectional view of microscope cooling chamber embodying the invention. Fig. 2 is a sectional view taken on line 2—2 of Fig. 1.

The microscope cooling chamber comprises a general container 1 which forms an object space 4. The latter is closed on top and bottom by glass plates 7 and 5. Another glass plate 6 may be inserted in the bottom of the container 1. In order to prevent the formation of a precipitate on the top plate 7, the later may form the bottom of a smaller vessel 15 which contains a liquid 8 having a suitable low freezing point. The other glass plates may in a known manner be provided with electrical heating elements, not shown, which serve a similar purpose. The container 1 is filled with a suitable cooling liquid 2 which enters the container through a pipe 3 and flows off through another pipe 16. The microscope is identified by a portion of the microscope tube 17.

The object space 4 communicates with the outside air through two channels 9 and 10, one to each side. These channels are so dimensioned as to accommodate object carrying slides or carriers such as are indicated at 11, 12 and 13. The channels 9 and 10 may be separate pieces fitted into the container 1. The particular construction is immaterial and in the drawing these channels are shown as being integral parts of the container.

The temperature in the channels are lower than the temperature of the outside air hence a precipitate caused by whatever moisture exists in the air is formed in the channels and it has been found that with such an arrangement the air in the object space is dry and no precipitate is formed therein on the glass plates 7 and 5. Microscopic observation is therefore not hindered by any such precipitate. The temperature in the object chamber 4 may be measured in a known manner by a thermocouple indicated at 20.

Another advantage shown in the drawing is that the object carriers may be easily pushed into proper position in the object space and easily shifted about.

The lengths of the channels 9 and 10 is governed by the temperature which is to prevail within the object space and for practical reasons these channels will be so long that they can accommodate at one time two or three object carriers. The channels may also be insulated if desired. No insulation is shown in the drawing. As an example it may be stated that if the object space is to be cooled with liquid air, the channels must each be at least ten centimeters long if they in addition are insulated with felt for instance.

I claim:

1. In a microscope, a container having means forming a centrally disposed object space therein, a cooling liquid in said container surrounding said object space and elongated channels leading from opposite sides of said space through said cooling liquid to the outside of the container for establishing communication with the air outside the container, said channels having a cross-section dimensioned for the passage of selected object carriers and being of a length sufficient to cause a drop in temperature of the air passing through said channels to the object space to prevent a precipitate being formed in said space by moisture in the surrounding air.

2. A cooling device according to claim 1 characterized by that the lengths of said channels equal the length of at least two selected object carriers.

CONRAD WEYGAND.